United States Patent
Schulze et al.

(10) Patent No.: US 10,800,280 B2
(45) Date of Patent: Oct. 13, 2020

(54) MODULAR HOME ENERGY SYSTEM HAVING A BUS SYSTEM AND AN AC VEHICLE CHARGING DEVICE

(71) Applicant: Dr. Ing. h.c. F. Porsche Aktiengesellschaft, Stuttgart (DE)

(72) Inventors: Simon Schulze, Urbach (DE); Ralf Oestreicher, Sindelfingen (DE); Dennis Müller, Illingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 57 days.

(21) Appl. No.: 16/181,863

(22) Filed: Nov. 6, 2018

(65) Prior Publication Data

US 2019/0184840 A1 Jun. 20, 2019

(30) Foreign Application Priority Data

Dec. 19, 2017 (DE) .................. 10 2017 130 497

(51) Int. Cl.
| | |
|---|---|
| *B60L 53/30* | (2019.01) |
| *H02J 3/38* | (2006.01) |
| *B60L 53/14* | (2019.01) |
| *H02J 3/32* | (2006.01) |
| *H02J 13/00* | (2006.01) |

(52) U.S. Cl.
CPC .............. *B60L 53/30* (2019.02); *B60L 53/14* (2019.02); *H02J 3/32* (2013.01); *H02J 3/383* (2013.01); *H02J 13/00001* (2020.01); *B60L 2230/12* (2013.01); *B60L 2230/16* (2013.01); *B60L 2230/22* (2013.01)

(58) Field of Classification Search
CPC .................................. B60L 53/30; B60L 53/14
USPC .......................................................... 307/77
See application file for complete search history.

(56) References Cited

U.S. PATENT DOCUMENTS

| | | | |
|---|---|---|---|
| 8,963,481 B2* | 2/2015 | Prosser ................... | B60L 53/00 320/104 |
| 2002/0195989 A1* | 12/2002 | Teramoto .................. | F03D 1/04 320/101 |
| 2010/0017045 A1 | 1/2010 | Nesler et al. | |
| 2010/0198428 A1* | 8/2010 | Sultan ................ | G07C 9/00309 701/2 |
| 2011/0204720 A1* | 8/2011 | Ruiz ....................... | B60L 55/00 307/66 |
| 2011/0273917 A1* | 11/2011 | Maitra .................... | H02J 3/383 363/74 |
| 2013/0257346 A1 | 10/2013 | Jakins et al. | |
| 2016/0176305 A1* | 6/2016 | James ................. | H02M 7/5387 307/26 |
| 2016/0214491 A1* | 7/2016 | Yoko ....................... | B60L 53/20 |
| 2017/0047739 A1 | 2/2017 | Berger | |
| 2017/0174086 A1 | 6/2017 | van de Loo | |
| 2017/0207631 A1* | 7/2017 | Helling ................... | H02J 3/382 |

(Continued)

FOREIGN PATENT DOCUMENTS

| | | |
|---|---|---|
| DE | 202010009207 U1 | 10/2010 |
| DE | 102016124491 A1 | 6/2017 |

OTHER PUBLICATIONS

German Examination Report for German Application No. 10 2017 130 497.5, with partial translation, dated Oct. 19, 2018—9 pages.

*Primary Examiner* — Adi Amrany
(74) *Attorney, Agent, or Firm* — RatnerPrestia

(57) ABSTRACT

A home energy system for storing and providing energy.

15 Claims, 1 Drawing Sheet

(56) References Cited

U.S. PATENT DOCUMENTS

| | | | |
|---|---|---|---|
| 2018/0037121 A1* | 2/2018 | Narla | B60L 53/53 |
| 2018/0037131 A1* | 2/2018 | Son | B60L 11/1861 |
| 2018/0264955 A1* | 9/2018 | Gupta | B60L 11/1811 |
| 2018/0297681 A1* | 10/2018 | Brennan | B63H 21/17 |
| 2020/0014310 A1* | 1/2020 | Helling | B60L 1/00 |
| 2020/0067319 A1* | 2/2020 | Qin | H02J 7/007 |

\* cited by examiner

MODULAR HOME ENERGY SYSTEM HAVING A BUS SYSTEM AND AN AC VEHICLE CHARGING DEVICE

CROSS-REFERENCE TO RELATED APPLICATION

This application claims priority to German Patent Application No. DE 10 2017 130 497.5, filed Dec. 19, 2017, the contents of such application being incorporated by reference herein in their entirety.

FIELD OF THE INVENTION

The present invention relates to a home energy system for storing and providing energy.

BACKGROUND OF THE INVENTION

The increasing prevalence of obtaining energy from renewable sources such as wind power or photovoltaics is changing the infrastructure for supplying energy. A multiplicity of wind turbines and photovoltaic installations decentralizes energy production. At the same time, the dependence of wind power and photovoltaics on external circumstances, that is to say on wind and sunshine, requires the possibility of storing energy in large amounts. Furthermore, increasingly more motor vehicle owners are relying on electric vehicles. Electric vehicles constitute a large consumer of electrical energy. The vehicles are usually charged at home, that is to say often in direct proximity to the home photovoltaics installation.

The proximity of power consumers to power generators with the need to store electrical energy increases demands on home energy systems. Home energy systems can store electrical energy from solar installations or from the local power supply network in rechargeable batteries and, where necessary, can output said electrical energy to the household or to an electric vehicle.

Document US 2017 17 40 86, which is incorporated by reference herein, discloses a house and motor vehicle energy system having an electricity generator, which generates electrical energy from combustible fuel, produces heat and is mounted in the motor vehicle, a detachable electricity supply line for transmitting electrical energy between the house and the motor vehicle, and a control device.

Document US 2010 01 70 45, which is incorporated by reference herein, discloses a home energy system, which is connected to a vehicle socket and contains a plurality of storage modules and solar modules.

A disadvantage of the prior art is that the known home energy systems have to be permanently wired and connected to the household. In particular, the energy storage elements are not portable. Both the storage modules and the solar modules have to be installed by an electrician with a high degree of outlay. Use of the energy storage element as a mobile socket is thus likewise not possible, like a simple retrospective expansion with further storage or solar modules.

SUMMARY OF THE INVENTION

Described herein is a home energy system and a method for operating a home energy system, which home energy system offers the advantages of energy storage and energy provision known from the prior art and can be expanded at the same time by a non-electrician and can be used in part as a portable energy storage element.

The home energy system for storing and providing energy has an AC vehicle charging device, wherein the home energy system has a first module and a second module, wherein the home energy system has a bus system for connecting the AC vehicle charging device, the first module and the second module, wherein the first module is portable, characterized in that the AC vehicle charging device, the first module and the second module are designed in such a way that they can be plugged into one another for connection to the bus system. Being able to be plugged into one another means here that the first module and the second module as well as the AC vehicle charging device can be plugged together without tools even by non-electricians using proprietary plugs and sockets. This advantageously produces the option of reconfiguring the home energy system, adding modules or removing modules in an uncomplicated manner. Portable modules can thus be removed easily from the home energy system and be added to a second home energy system. It is furthermore possible to combine an arbitrary number of modules with one another.

According to a further preferred embodiment of the present invention, the first module is embodied as an energy storage element. It is thus advantageously possible to store energy in the home energy system or to draw the stored energy from the home energy system using the module and to transport said stored energy.

According to a further preferred embodiment of the present invention, the energy storage element has a socket for outputting electrical energy. The socket can be, for example, a Schuko socket of plug type F. It is thus possible to use an energy storage element of the home energy system as a mobile socket.

According to a further preferred embodiment of the present invention, the second module is embodied as a solar module. This produces the option of feeding solar energy into the home energy system. In this case, solar panels on the roof and a line from the solar panels to the solar module containing the appropriate hardware to feed the electrical energy generated in the solar panels into the home energy system would be conceivable.

According to a further preferred embodiment of the present invention, the bus system is integrated into the AC vehicle charging device, into the first module and into the second module. This advantageously makes it possible to set up the home energy system in an uncomplicated manner. The direct joining of modules saves the user working steps, reduces the number of necessary components and makes it possible to design the modules in a very robust, constructive manner.

According to a further preferred embodiment of the present invention, the AC vehicle charging device is connected to the domestic power supply network. This makes it possible to draw electrical energy from the domestic network for the home energy system and hence, for example, to charge an electric vehicle or to charge an energy storage element conceived as a mobile socket. It is conceivable to couple the AC vehicle charging device to the local power supply network in a manner protected individually. Electrical energy from the solar modules of the home energy system could therefore be fed to the local power supply network or to the domestic network. A function of the home energy system as a buffer storage element for electrical energy from the local power supply network is also conceivable. In the case of an existing oversupply of electrical energy in the local power supply network, said electrical energy could be stored by the home energy system and output again when the oversupply no longer exists.

According to a further preferred embodiment of the present invention, the AC vehicle charging device has an operator control and display unit for controlling the home energy system and for visualizing operating parameters of the home energy system. Information such as, for example, the state of charge of the energy stores or the amount of electrical energy generated in the solar modules can be displayed on said operator control and display unit.

According to a further preferred embodiment of the present invention, the operator control and display unit is provided with an option for wireless transmission of information about operating parameters of the home energy system and control commands for controlling the home energy system.

This makes it possible for the user to control the home energy system, for example, from the electric vehicle or from their cell phone. Furthermore, incorporation into a smart home system is therefore conceivable.

A further subject of the present invention is a method for operating the home energy system as described above, wherein the home energy system is set up by reversibly plugging the AC vehicle charging device and the first module and the second module to one another. The reversible plugging to one another is to be understood here as meaning that no tool is required for this and the process can be carried out by a non-electrician. This advantageously makes it possible to set up and reconfigure the home energy system in a simple manner.

According to a further preferred embodiment of the present invention, the AC vehicle charging device and the first module are plugged to one another by means of a first separation point of the first module that can be plugged to a pluggable separation point of the AC vehicle charging device, and the first module and the second module are plugged to one another by means of a first separation point of the second module that can be plugged to a second pluggable separation point of the first module. This makes it possible to expand the home energy system with modules or to remove modules without further components being required. Furthermore, it is thus possible to provide stable, robust and secure plug connections for the setup of the home energy system. The simplicity of plugging the modules together makes it possible for even a non-electrician to reconfigure the home energy system.

According to a further preferred embodiment of the present invention, an electric vehicle is charged and/or discharged and/or energy storage elements connected to the home energy system are charged and/or discharged by means of the AC vehicle charging device, wherein the electrical energy for charging the electric vehicle and/or the energy storage elements is provided by the domestic power supply network and/or by the solar modules connected to the home energy system and/or electrical energy is fed from the electric vehicle and/or from the connected energy storage elements and/or from the connected solar modules to the local power supply network. This makes it possible to use the home energy system in a flexible manner as a charging apparatus for an electric vehicle, as an energy supplier for the domestic power supply network through feeding in electrical energy from the solar modules or else as a buffer storage element in the case of an oversupply or undersupply of electrical energy in the local power supply network across the domestic power supply network.

BRIEF DESCRIPTION OF THE DRAWING

Further details, features and advantages of the invention will emerge from the drawing and from the following description of preferred embodiments on the basis of the drawing. Here, the drawing illustrates merely exemplary embodiments of the invention, which do not restrict the concept of the invention.

In the different figures, identical parts are always provided with the same reference symbols and are therefore also generally designated or mentioned in each case only once.

DETAILED DESCRIPTION OF THE INVENTION

Figure 1:
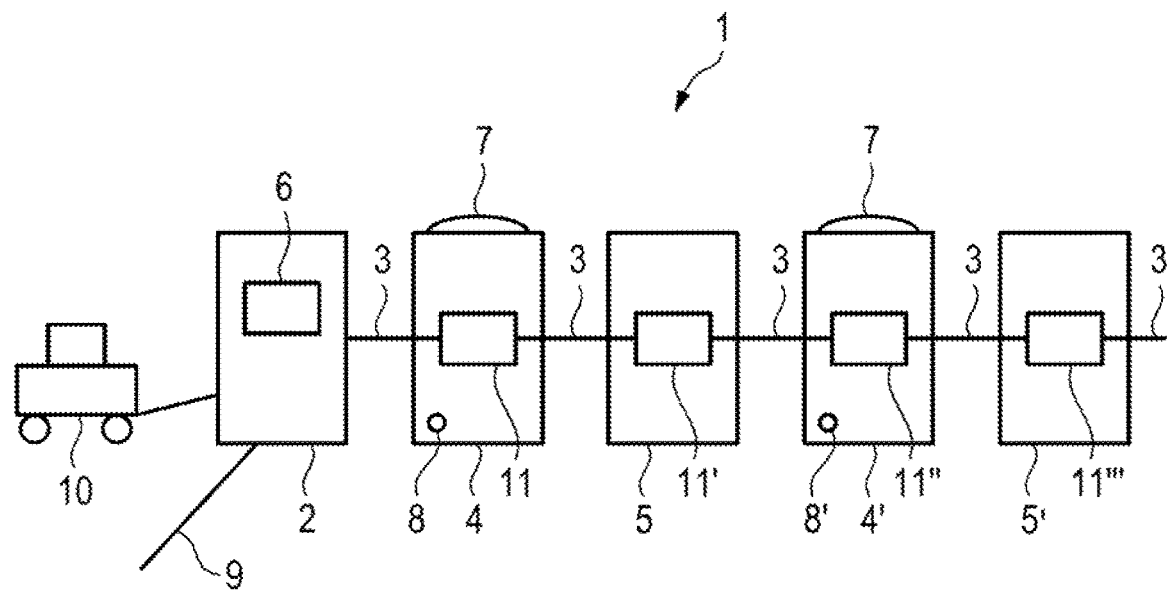
FIG. 1 schematically illustrates the setup of the home energy system.

FIG. 1 illustrates the schematic setup of the home energy system 1. The AC vehicle charging device 2 and the first module 4, the second module 5, a third module 4' and a fourth module 5' are connected to one another by means of a bus system 3. The first module 4 and the third module 4' are embodied as portable energy storage elements. A handle 7 permits simple transport and use as a mobile energy source by way of the socket 8 of the first module 4 and the socket 8' of the third module 4'. The second module 5 and the fourth module 5' are embodied as solar modules and feed electrical energy to the home energy system by means of photovoltaics. The first module 4 is provided with a first inverter 11, the second module 5 is provided with a second inverter 11', the third module 4' is provided with a third inverter 11" and the fourth module 5' is provided with a fourth inverter 11''' for operation in the home energy system. The AC vehicle charging device 2 is connected to the domestic power supply network 9 and thereby to the local power supply network in a manner protected individually. This permits electrical energy to be taken up by the domestic power supply network 9 and/or to be output from the local power supply network into the home energy system 1. The home energy system 1 can thus be used as an energy storage element and as an energy source. Furthermore, use as an energy buffer for fluctuations in supply in the domestic power supply network 9 or in the local power supply network is possible. An electric vehicle 10 is connected to the AC vehicle charging device 2. Said electric vehicle can be charged and discharged like the energy storage elements of the home energy system. The home energy system 1 is controlled by means of an operator control and display unit 6, which displays operating parameters of the home energy system 1.

Figure 2:
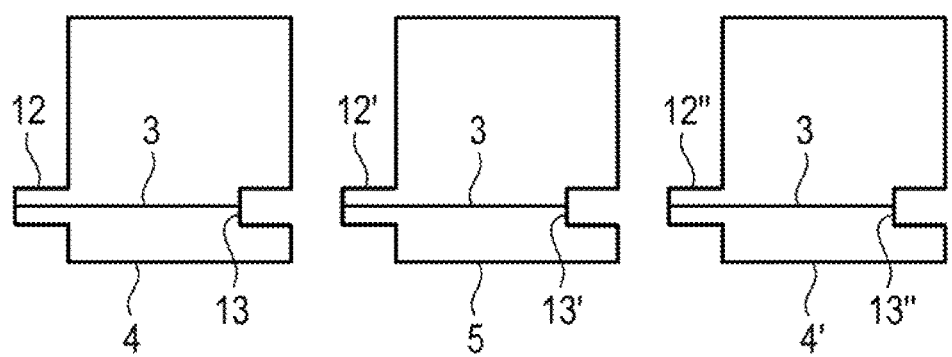
FIG. 2 schematically illustrates the plugging of a plurality of modules together.

FIG. 2 schematically shows the plugging of a plurality of modules together. The first module 4 has a first pluggable separation point of the first module 12 and a second pluggable separation point of the first module 13, which second pluggable separation point is shaped in a manner complementary to the first pluggable separation point of the first module 12. The second module 5 has a first pluggable separation point of the second module 12', which is shaped exactly like the first pluggable separation point of the first module 12. Furthermore, the second module has a second pluggable separation point of the second module 13', which is shaped exactly like the second pluggable separation point of the first module 13. The third module 4' has a first pluggable separation point of the third module 12", which is shaped exactly like the first pluggable separation point of the first module 12. Furthermore, the third module 4' has a second pluggable separation point of the third module 13", which is shaped exactly like the second pluggable separation point of the first module 13. To join the first module 4 and the second module 5, the first pluggable separation point of the second module 12' is plugged into the second pluggable separation point of the first module 13. To join the second module 5 and the third module 4', the first pluggable separation point of the third module 12" is plugged into the second pluggable separation point of the second module 13'. With the joining of the first module 4 to the second module 5, the bus system 3 is also connected between the first module 4 and the second module 5. Likewise with the joining of the second module 5 to the third module 4', the bus system 3 is also connected between the second module 5 and the third module 4'.

What is claimed is:

1. A home energy system for storing and providing energy to an electric vehicle, said home energy system being exterior of the electric vehicle and comprising:
   a home-based AC vehicle charging device having a line that is configured to be removably connected to the electric vehicle for charging the electric vehicle, and another line that is configured to be connected to a domestic power supply network grid for receiving power from the domestic power supply network grid,
   a first module having a first energy storage element and an inverter, wherein the first module is portable,
   and a second module having a second energy storage element and an inverter,
   a bus system for connecting the AC vehicle charging device, the first module and the second module,
   wherein the AC vehicle charging device, the first module and the second module are configured to be plugged into one another for connection to the bus system,
   wherein each module includes a first connection on one side of the module and a second connection on an opposing side of the module, wherein the first connection of one of the modules is configured to be connected to the second connection of the other module.

2. The home energy system as claimed in claim 1, wherein the energy storage element has a socket for outputting electrical energy.

3. The home energy system as claimed in claim 1, further comprising a third module in the form of a solar module.

4. The home energy system as claimed in claim 1, wherein the bus system is integrated into the AC vehicle charging device, the first module and the second module.

5. The home energy system as claimed in claim 1, wherein the AC vehicle charging device has an operator control and display unit for controlling the home energy system and for visualizing operating parameters of the home energy system.

6. The home energy system as claimed in claim 5, wherein the operator control and display unit is provided with an option for wireless transmission of information about operating parameters of the home energy system and control commands for controlling the home energy system.

7. The home energy system as claimed in claim 1, wherein the modules are modular.

8. The home energy system as claimed in claim 1, wherein the first connection is also configured to be connected to the AC vehicle charging device.

9. The home energy system as claimed in claim 1, wherein each module includes a carrying handle.

10. The home energy system as claimed in claim 1, wherein each module includes a socket such that the module is configured to be used as a mobile energy source.

11. The home energy system as claimed in claim 1, wherein each module is an energy storage element.

12. A method for operating a home energy system for charging an electric vehicle, said home energy system being exterior of the electric vehicle and including (i) a home-based AC vehicle charging device having a line that is configured to be removably connected to the electric vehicle for charging the electric vehicle, and another line that is configured to be connected to a domestic power supply network grid for receiving power from the domestic power supply network grid, (ii) a first portable module having a first energy storage element and an inverter, (iii) a second module having a second energy storage element and an inverter, (iv) a bus system for connecting the AC vehicle charging device, the first module and the second module, wherein each module includes a first connection on one side of the module and a second connection on an opposing side of the module, wherein the first connection of one of the modules is configured to be connected to the second connection of the other module, said method comprising the step of:
    setting up the home energy system by reversibly plugging the AC vehicle charging device and the first module and the second module to one another; and
    removably connecting the line to the electric vehicle for charging the electric vehicle.

13. The method as claimed in claim 12, wherein the AC vehicle charging device and the first module are plugged to one another by a first separation point of the first module that can be plugged to a pluggable separation point of the AC vehicle charging device and the first module and the second module are plugged to one another by a first separation point of the second module that can be plugged to a second pluggable separation point of the first module.

14. The method as claimed in claim 12, further comprising either charging or discharging an electric vehicle or energy storage elements connected to the home energy system using the AC vehicle charging device, wherein electrical energy for charging the electric vehicle or the energy storage elements is provided by the domestic power supply network grid or by solar modules connected to the home energy system or electrical energy is fed from the electric vehicle or from the connected energy storage elements or from the connected solar modules to the local power supply network.

15. The method as claimed in claim 12, further comprising displaying operating parameters of the home energy system, controlling the home energy system at an operator control and display unit on the home energy system or at an end device of a user that is programmed to control and display operating parameters of the home energy system.

* * * * *